July 18, 1939.  A. A. ROLAN  2,166,666
SHEET METAL SNAP HOOK
Filed Sept. 19, 1938
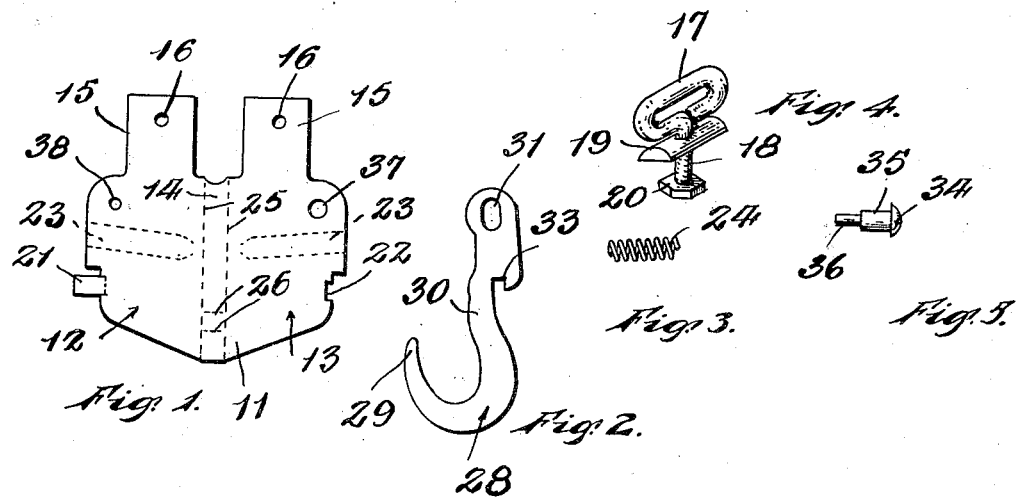
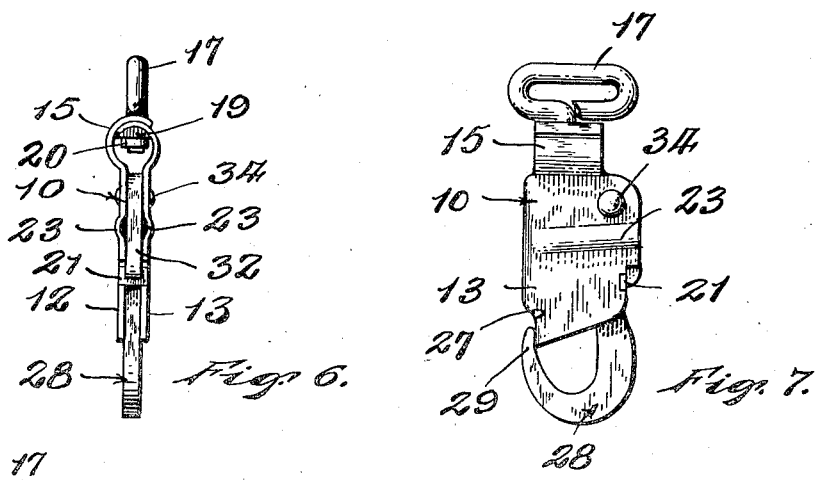
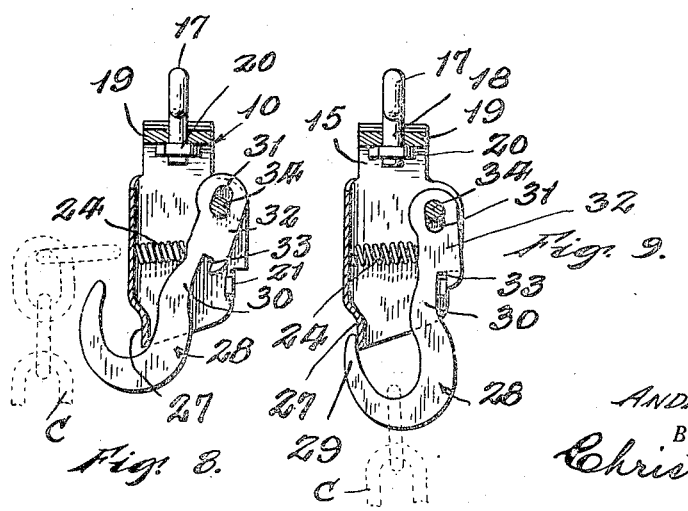
INVENTOR:
ANDREW A. ROLAN,
BY:
Christian R. Nielsen
ATTORNEY.

Patented July 18, 1939

2,166,666

UNITED STATES PATENT OFFICE 2,166,666

SHEET METAL SNAP HOOK

Andrew A. Rolan, Detroit, Mich.

Application September 19, 1938, Serial No. 230,689

4 Claims. (Cl. 24—234)

This invention relates to hooks and more particularly to a self-locking snap hook, and it consists in the constructions, arrangements and combinations herein described and claimed.

It is an object of the invention to provide a snap hook in which the hook proper may be quickly moved to an open position for engagement with an object to be secured and in which the hook will be moved to a securely locked position upon draft or pull upon the hook.

It is a further object of the invention to provide a snap-hook which may be readily formed from sheet metal of proper guage, affording a sturdy structure and one which may be manufactured and sold at a low cost.

Additional objects, advantages and features of invention will be apparent from the following description and accompanying drawing, wherein:

Figure 1 is a plan view of the blank forming the body of the hook.

Figures 2 to 5 illustrate details of the hook.

Figure 6 is an edge view of the assembled hook.

Figure 7 is a side elevation thereof.

Figure 8 is a vertical sectional view of the hook in open position.

Figure 9 is a similar view illustrating the parts in closed position.

There is illustrated in Figures 6 to 9 inclusive, a hook generally indicated by the reference character 10, which in the present instance comprises a sheet metal body 11, cut or stamped from stock material to provide two planiform side plates 12 and 13 interconnected by a medial portion 14 (see Fig. 1). Each of the plates 12 and 13 include upper portions 15 of lesser width than the plates and extend medially therefrom, and in the formation of the body the portions 15 are arced and bent inwardly so that one overlies the other, as shown in Figure 6, and in such relation apertures 16 of the portions will be aligned for reception of a swivel connection 17. The connector in the present instance comprises a shank 18 of a diameter to freely pass through the aperture 16, and the shank also mounts a semicircular plate 19 beneath the curved portions 15. A washer or nut 20 is fixed to the end of the shank for securement of the connector. In the case of a washer, the end of the shank will be peened or otherwise upset and in the event that a nut is employed, the shank will be screw-threaded.

The plate 12 has formed upon its vertical edge a tongue 21, and the plate 13 is provided with a rabbet 22 of a width to frictionally seat the tongue 21, as will be described more fully hereinafter.

Each of the plates 12 and 13 is formed with an elongated recess 23 extending from the vertical edges toward the medial portion 14. The recesses 23 are presented upon the inner faces of the plates and when the body is bent into final shape, the recesses are in opposed relation, forming a channel for seating of a helical spring 24.

In shaping of the body 11, the stock is bent along the dotted lines 25 to bring the plates 12 and 13 into parallel relation, and also bent inwardly along the horizontal line 26, forming the inwardly set portion 27. The recesses 23 having been previously formed it is now only necessary to bend the portions 15 into overlapped relation. The portions 14 is of a width slightly greater than the hook 28 now to be described.

The hook 28 comprises a curved bill 29 adapted to seat in the inset portion 27 of the body in one of its positions, and from the hook a stem 30 is extended. Adjacent the upper end of the stem 30 a vertically disposed elongated aperture 31 is formed and intermediately of the length of the stem the body is widened as at 32. The widened portion 32 projects beyond the stem 30, and is formed with upwardly extended open slot 33, the slot being of a width to receive the tongue 21 therein, as clearly shown in Figure 9.

A pin 34 is provided and in the present instance is shown as having a main shank 35, Figure 5, of a diameter to freely extend through the slot 31 and a reduced end 36. The pin 34 is extended through the aperture 37 of the plate 13, the slot 31 of the hook and the reduced end 36 will extend through the apertures 38 of the plate 12, where the end is peened for securement of the parts. It will be seen that by providing a reduced end a shoulder is formed for support of the plate 12 and assuring free movement of the hook.

With the hook assembled, the spring 24 is interposed between the portion 14 and the stem 30 of the hook, and the tension of the spring is such as to swing the hook backwardly against the tongue 21 and in such position the bill 29 will seat in the inset portion 27.

From the foregoing, the construction will be readily understood and in operation, when it is desired to open the hook, the hook 28 is moved upwardly, as seen in Figure 9, disengaging the tongue 21. It is now only necessary to move the hook laterally against the tension of the spring 24 to the position shown in Figure 8. The bill 29 is clear then to receive the chain or other member C. Upon release of the hook 28 the spring will move the hook backwardly to its normal position and upon a pull or draft upon the chain C the hook 28 will be moved longitudinally downward so that the slot 33 receives the tongue 21, thereby locking the hook as against accidental disengagement.

The hook described may be made in various sizes and of appropriate guage metal to meet different requirements, and while I have shown and described a preferred form, this is by way of illustration only, and I consider as my own all such modifications as fairly fall within the scope of the appended claims.

I claim:

1. A latch hook comprising a sheet metal body member having an edge portion and integral, parallel side plates, one of said plates having a tongue, the other plate having a slot for reception of the tongue, said tongue extended at right angles to the plates, a pin connecting the plates, a hook member, said hook member having a vertically extended slot for reception of the pin, said hook member further having an open-ended slot for engaging the tongue when the hook is moved in a vertical downward direction and spring means urging said hook into abutting relation with the tongue.

2. A latch hook comprising a sheet metal body member having an edge portion and integral parallel spaced side plates, said plates having upper portions bent to overlie one another, said portions having aligned apertures, a swivel connector having a shank disposed through the apertures and secured therein, a tongue on one of the plates, the other plate having a slot for reception of the tongue, said tongue extended at right angles to the plates, a pin connecting the plates, a hook member, said hook member having a vertically extended slot for reception of the pin, said hook member further having an open-ended slot for engaging the tongue when the hook is moved in a vertical downward direction and spring means interposed between the edge portion and the tongue whereby to urge the hook against the tongue.

3. A latch hook comprising a sheet metal body member having an edge portion and integral parallel spaced side plates, said plates having upper portions bent to overlie one another, said portions having aligned apertures, a swivel connector having a shank disposed through the apertures and secured therein, a tongue on one of the plates, the other plate having a slot for reception of the tongue, said tongue extended at right angles to the plates, a pin connecting the plates, a hook member, said hook member having a vertically extended slot for reception of the pin, said hook member further having an open-ended slot for engaging the tongue when the hook is moved in a vertical downward direction, each plate having an elongated recess arranged in opposed relation, a helical spring seated between the recesses, said spring being interposed between the edge portion and the hook whereby to urge the hook against the tongue.

4. A latch hook comprising a body member having an edge portion and integral parallel side members, a pin connected between the side members, a hook member having a vertical slot and receiving the pin therethrough to permit vertical and lateral movement of the hook between the side members, a tongue on the body member and extended across the side members rearwardly of the hook, spring means urging said hook into abutting relation with the tongue and said hook having a downwardly open-ended slot complemental to said tongue, when said hook is moved in a vertical downward direction.

ANDREW A. ROLAN.